(12) United States Patent
Mattarocci

(10) Patent No.: US 10,065,669 B2
(45) Date of Patent: Sep. 4, 2018

(54) STROLLER

(71) Applicant: Baby Trend, Inc., Ontario (CA)

(72) Inventor: Bradley James Mattarocci, Rancho Cucamonga, CA (US)

(73) Assignee: Baby Trend, Inc., Ontario, CA (US)

( * ) Notice: Subject to any disclaimer, the term of this patent is extended or adjusted under 35 U.S.C. 154(b) by 0 days.

(21) Appl. No.: 14/320,148

(22) Filed: Jun. 30, 2014

(65) Prior Publication Data
US 2015/0001821 A1 Jan. 1, 2015

Related U.S. Application Data

(60) Provisional application No. 61/841,228, filed on Jun. 28, 2013.

(51) Int. Cl.
| | |
|---|---|
| *B62B 9/08* | (2006.01) |
| *B62B 9/10* | (2006.01) |
| *B62B 9/14* | (2006.01) |
| *B62B 9/28* | (2006.01) |
| *B62B 5/08* | (2006.01) |

(52) U.S. Cl.
CPC ............... *B62B 9/104* (2013.01); *B62B 9/14* (2013.01); *B62B 9/28* (2013.01); *B62B 5/087* (2013.01)

(58) Field of Classification Search
CPC .................................................. B62B 7/008
See application file for complete search history.

(56) References Cited

U.S. PATENT DOCUMENTS

| | | | |
|---|---|---|---|
| 856,850 | A | 6/1907 | Dobe |
| 1,017,983 | A | 2/1912 | Long |
| 1,024,176 | A | 4/1912 | Boyens |
| 1,075,372 | A | 10/1913 | Overshiner |
| 1,076,087 | A | 10/1913 | Wannenwetsch |
| 1,090,950 | A | 3/1914 | Spoffard et al. |
| 1,112,595 | A | 10/1914 | Brown |
| 1,125,441 | A | 1/1915 | Bailey |
| 1,131,559 | A | 3/1915 | Schrek |
| 1,197,014 | A | 9/1916 | Cunningham |
| 1,241,357 | A | 9/1917 | Drosdowet |
| 1,335,122 | A | 3/1920 | Mahr |
| 1,336,725 | A | 4/1920 | Biwoin |

(Continued)

FOREIGN PATENT DOCUMENTS

| | | |
|---|---|---|
| BE | 1000111 A4 | 3/1988 |
| BE | 1004831 A4 | 2/1993 |

(Continued)

OTHER PUBLICATIONS miaMODA Compagno stroller, located at http://www.miamodausa.com/494CompagnoStroller.html, May 29, 2013.

(Continued)

*Primary Examiner* — Erez Gurari
(74) *Attorney, Agent, or Firm* — Faegre Baker Daniels LLP

(57) ABSTRACT

A stroller configured to support a child is provided that includes a frame, a plurality of wheels supporting the frame, a forward facing seat supported by the frame, a rearward facing seat supported by the frame, a seat back positioned to support a child reclining in the forward facing seat, and a platform positioned rearward of the forward facing seat to support a child standing on the platform.

23 Claims, 19 Drawing Sheets

(56) References Cited

U.S. PATENT DOCUMENTS

| | | | |
|---|---|---|---|
| 1,357,878 | A | 11/1920 | Lark |
| 1,381,415 | A | 6/1921 | Gudeli |
| 1,385,959 | A | 7/1921 | Weasler |
| 1,392,461 | A | 10/1921 | Struebing |
| 1,403,261 | A | 1/1922 | Lynn |
| 1,409,838 | A | 3/1922 | Emery et al. |
| 1,421,260 | A | 6/1922 | Kurnick |
| 1,432,114 | A | 10/1922 | Mahr |
| 1,443,020 | A | 1/1923 | Froman |
| 1,448,783 | A | 3/1923 | Blewitt et al. |
| 1,470,630 | A | 10/1923 | Mahr |
| 1,480,451 | A | 1/1924 | Koch |
| 1,508,500 | A | 9/1924 | Bingen et al. |
| 1,524,416 | A | 1/1925 | Waitekaites et al. |
| 1,553,889 | A | 9/1925 | Boettcher |
| 1,582,045 | A | 4/1926 | Howe |
| 1,586,411 | A | 5/1926 | Csima |
| 1,596,283 | A | 8/1926 | Mahr |
| 1,617,037 | A | 2/1927 | Vlcek |
| 1,662,754 | A | 3/1928 | Millard |
| 1,793,848 | A | 2/1931 | Gill et al. |
| 1,872,216 | A | 8/1932 | Appleby |
| 1,881,579 | A | 10/1932 | Hoch et al. |
| 1,981,285 | A | 11/1934 | Rechlicz |
| 2,177,833 | A | 10/1939 | Kroll et al. |
| 2,262,433 | A | 11/1941 | Uecker et al. |
| 2,276,792 | A | 3/1942 | Peltier |
| 2,278,582 | A | 4/1942 | Feldman |
| 2,389,574 | A | 11/1945 | Hulquist |
| 2,415,146 | A | 2/1947 | Nanna |
| 2,425,574 | A | 8/1947 | Stewack |
| 2,426,432 | A | 8/1947 | Breckner et al. |
| 2,436,664 | A | 2/1948 | Nyberg |
| 2,438,829 | A | 3/1948 | Skolnik |
| 2,451,956 | A | 10/1948 | Kemper |
| 2,471,004 | A | 5/1949 | Moster |
| 2,476,727 | A | 7/1949 | Hardman |
| 2,509,584 | A | 5/1950 | Zoll |
| 2,512,995 | A | 6/1950 | Berger |
| 2,606,593 | A | 8/1952 | Beurskens |
| 2,711,328 | A | 6/1955 | Shone et al. |
| 2,769,482 | A | 11/1956 | Carlson |
| 2,797,743 | A | 7/1957 | Rodtz, Jr. |
| 2,798,733 | A | 7/1957 | Gill |
| 2,840,383 | A | 6/1958 | Coven et al. |
| 2,873,123 | A | 2/1959 | Eppinger |
| 2,907,372 | A | 10/1959 | Leger |
| 2,917,316 | A | 12/1959 | Gill |
| 2,993,702 | A | 7/1961 | Gill |
| 3,061,328 | A | 10/1962 | Konar |
| 3,063,729 | A | 11/1962 | Hamilton |
| 3,083,997 | A | 4/1963 | Chreist, Jr. |
| 3,184,249 | A | 5/1965 | Shone |
| 3,208,763 | A | 9/1965 | Boyd |
| 3,223,431 | A | 12/1965 | Gottfried et al. |
| 3,248,125 | A | 4/1966 | Gill |
| 3,288,482 | A | 11/1966 | Gottfried et al. |
| 3,309,101 | A | 3/1967 | Romay |
| 3,334,909 | A | 8/1967 | Smith et al. |
| 3,421,774 | A | 1/1969 | Patterson |
| 3,459,435 | A | 8/1969 | Garner |
| 3,512,599 | A | 5/1970 | Hott et al. |
| 3,556,546 | A | 1/1971 | Garner |
| 3,561,787 | A | 2/1971 | Toda et al. |
| 3,689,099 | A | 9/1972 | Patterson |
| 3,799,567 | A | 3/1974 | Toda |
| 3,829,113 | A | 8/1974 | Epelbaum |
| 3,918,822 | A | 11/1975 | Rauschenberger |
| 4,065,177 | A | 12/1977 | Hyde et al. |
| 4,089,543 | A | 5/1978 | Osborne |
| 4,108,468 | A | 8/1978 | Orlanski |
| 4,116,465 | A | 9/1978 | Maclaren |
| 4,157,839 | A | 6/1979 | Lahti et al. |
| 4,173,355 | A | 11/1979 | Perego |
| 4,191,397 | A | 3/1980 | Kassai |
| 4,239,259 | A | 12/1980 | Martinez |
| 4,294,464 | A | 10/1981 | Ettridge |
| 4,317,581 | A | 3/1982 | Kassai |
| 4,362,315 | A | 12/1982 | Kassai |
| 4,412,689 | A | 11/1983 | Lee |
| 4,426,113 | A | 1/1984 | Schutz |
| 4,435,012 | A | 3/1984 | Kassai |
| RE31,760 | E | 12/1984 | Kassai |
| 4,529,219 | A | 7/1985 | Shamie |
| 4,537,414 | A | 8/1985 | Nusbaum |
| 4,544,178 | A | 10/1985 | Ai-Sheikh et al. |
| 4,568,125 | A | 2/1986 | Sckolnik |
| 4,570,956 | A | 2/1986 | Dyer |
| 4,606,550 | A | 8/1986 | Cone |
| 4,620,711 | A | 11/1986 | Dick |
| 4,632,409 | A | 12/1986 | Hall et al. |
| 4,697,823 | A | 10/1987 | Kassai |
| 4,709,966 | A | 12/1987 | Parkinson et al. |
| 4,714,141 | A | 12/1987 | Kassai |
| 4,725,071 | A * | 2/1988 | Shamie ............... B62B 7/08 280/47.4 |
| 4,728,112 | A | 3/1988 | Wynens |
| 4,729,572 | A | 3/1988 | Bergeron |
| 4,732,406 | A | 3/1988 | Kassai |
| 4,741,551 | A | 5/1988 | Perego |
| 4,750,783 | A | 6/1988 | Irby et al. |
| 4,753,453 | A | 6/1988 | Schilbach |
| 4,762,335 | A | 8/1988 | Kassai |
| 4,763,919 | A | 8/1988 | Nakao et al. |
| 4,768,795 | A | 9/1988 | Mar |
| 4,770,437 | A | 9/1988 | Glaser |
| 4,817,982 | A | 4/1989 | Kassai |
| 4,822,064 | A | 4/1989 | Hunter |
| 4,834,403 | A | 5/1989 | Yanus et al. |
| 4,836,573 | A | 6/1989 | Gebhard |
| 4,848,787 | A | 7/1989 | Kassai |
| 4,852,894 | A | 8/1989 | Dyer |
| 4,872,693 | A | 10/1989 | Kennel |
| 4,874,182 | A | 10/1989 | Clark |
| 4,878,339 | A | 11/1989 | Marier et al. |
| 4,878,680 | A | 11/1989 | Molnar |
| 4,892,327 | A | 1/1990 | Cabagnero |
| 4,896,894 | A | 1/1990 | Singletary |
| 4,907,818 | A | 3/1990 | Chai |
| 4,915,401 | A | 4/1990 | Severson et al. |
| 4,921,261 | A | 5/1990 | Sadler, Jr. et al. |
| 4,923,208 | A | 5/1990 | Takahashi |
| 4,930,697 | A | 6/1990 | Takahashi et al. |
| 4,953,887 | A | 9/1990 | Takahashi et al. |
| D311,363 | S | 10/1990 | Lin |
| 4,969,656 | A | 11/1990 | Clausen |
| 5,018,754 | A | 5/1991 | Cheng |
| 5,028,061 | A | 7/1991 | Hawkes |
| D321,850 | S | 11/1991 | Mong-Hsing |
| D322,420 | S | 12/1991 | Hawkes |
| 5,074,575 | A | 12/1991 | Bigo |
| 5,087,066 | A | 2/1992 | Mong-Hsing |
| 5,121,940 | A | 6/1992 | March |
| 5,123,670 | A | 6/1992 | Chen |
| 5,125,674 | A | 6/1992 | Manuszak |
| D328,047 | S | 7/1992 | Huang |
| 5,143,398 | A | 9/1992 | Teng |
| 5,167,425 | A | 12/1992 | Chen |
| 5,184,835 | A | 2/1993 | Huang |
| 5,197,753 | A | 3/1993 | Liu |
| 5,201,535 | A | 4/1993 | Kato et al. |
| 5,203,581 | A | 4/1993 | Jankowski |
| 5,205,577 | A | 4/1993 | Liu |
| 5,205,578 | A | 4/1993 | Liu |
| 5,205,579 | A | 4/1993 | Kato et al. |
| 5,234,224 | A | 8/1993 | Kim |
| 5,240,265 | A | 8/1993 | Huang |
| 5,257,799 | A | 11/1993 | Cone et al. |
| 5,290,049 | A | 3/1994 | Crisp |
| 5,312,122 | A | 5/1994 | Doty |
| 5,346,280 | A | 9/1994 | Deumite |
| 5,356,172 | A | 10/1994 | Levy et al. |
| 5,364,120 | A | 11/1994 | Shimansky |
| 5,366,036 | A | 11/1994 | Perry |

(56) References Cited

U.S. PATENT DOCUMENTS

| | | | |
|---|---|---|---|
| 5,370,408 A | 12/1994 | Eagan | |
| 5,378,042 A | 1/1995 | Daneshvar | |
| 5,380,023 A | 1/1995 | McBee | |
| 5,385,386 A | 1/1995 | Beamish et al. | |
| 5,388,852 A | 2/1995 | Bigo et al. | |
| D359,937 S | 7/1995 | Yoshie et al. | |
| 5,431,478 A | 7/1995 | Noonan | |
| 5,454,584 A | 10/1995 | Haut et al. | |
| 5,468,009 A | 11/1995 | Eyman et al. | |
| 5,522,614 A | 6/1996 | Eyman et al. | |
| 5,605,409 A | 2/1997 | Haut et al. | |
| 5,622,375 A | 4/1997 | Fairclough | |
| 5,664,795 A * | 9/1997 | Haung | B62B 9/28 280/47.35 |
| 5,839,748 A | 11/1998 | Cohen | |
| 5,882,030 A | 3/1999 | Haut | |
| 6,086,087 A * | 7/2000 | Yang | B62B 7/06 280/47.41 |
| 6,102,431 A | 8/2000 | Sutherland et al. | |
| 7,234,722 B1 | 6/2007 | Madigan et al. | |
| 7,775,548 B2 | 8/2010 | McIntyre et al. | |
| 8,322,745 B2 * | 12/2012 | Li | B62B 7/08 280/47.4 |
| 2001/0013688 A1 * | 8/2001 | Warner, Jr. | B62B 7/08 280/47.38 |
| 2008/0224508 A1 | 9/2008 | Yang | |
| 2012/0169021 A1 * | 7/2012 | Jane Santamaria | B62B 7/008 280/47.35 |
| 2013/0154241 A1 * | 6/2013 | Parkinson | B62B 7/008 280/650 |
| 2015/0217792 A1 * | 8/2015 | Stiba | B62B 7/008 280/650 |
| 2016/0001805 A1 * | 1/2016 | Pacella | B62B 7/145 280/47.38 |
| 2016/0046315 A1 * | 2/2016 | Zehfuss | B62B 7/008 280/33.993 |

FOREIGN PATENT DOCUMENTS

| | | |
|---|---|---|
| BE | 1004834 A4 | 2/1993 |
| CA | 483129 A | 5/1952 |
| CA | 1216264 A | 1/1987 |
| CA | 2033896 | 7/1992 |
| CA | 2074904 A1 | 2/1993 |
| CH | 322851 A | 6/1957 |
| CN | 2037706 U | 5/1989 |
| CN | 2051923 U | 1/1990 |
| CN | 2088076 U | 11/1991 |
| CN | 2099055 U | 3/1992 |
| CN | 2115007 U | 9/1992 |
| CN | 2115267 U | 9/1992 |
| CN | 2405839 | 11/2000 |
| CN | 101879910 | 11/2010 |
| CN | 102273854 | 12/2011 |
| DE | 1993805 | 9/1968 |
| DE | 3508616 A1 | 10/1985 |
| DE | 3525834 A1 | 1/1987 |
| DE | 9109676 U1 | 11/1991 |
| DE | 9301375 U1 | 4/1993 |
| EP | 0257141 A1 | 2/1988 |
| EP | 329878 A1 | 8/1989 |
| FR | 2579158 A1 | 3/1985 |
| FR | 2588752 A1 | 10/1985 |
| GB | 1216476 | 12/1970 |
| GB | 1576574 | 10/1980 |
| GB | 2243198 A | 10/1991 |
| GB | 2256685 A | 12/1992 |
| GB | 2472305 | 2/2011 |
| GB | 2493650 B | 5/2013 |
| JP | H103128762 | 5/1991 |
| RU | 2043230 C1 | 9/1995 |
| WO | 9322179 A1 | 11/1993 |

OTHER PUBLICATIONS

International Search Report and Written Opinion of the International Searching Authority issued by the ISA/US, Commissioner for Patents, dated Oct. 1, 2014, for International Application No. PCT/US2014/044928; 10 pages.

Examination Report dated Mar. 1, 2017, issued by the State Intellectual Property Office of the People's Republic of China for related Application No. 201480037057.7; 11 pages.

English translation of the Examination Report dated Mar. 1, 2017, issued by the State Intellectual Property Office of the People's Republic of China for related Application No. 201480037057.7; 9 pages.

* cited by examiner

US 10,065,669 B2

STROLLER

RELATED APPLICATION

This application claims priority to U.S. Provisional Patent Application Ser. No. 61/841,228, filed Jun. 28, 2013, titled "Stroller" to Bradley James Mattarocci, the entire disclosure of which is expressly incorporated by reference herein.

FIELD

The present disclosure relates generally to a stroller, and more particularly to a stroller having a platform upon which a child may stand.

BACKGROUND AND SUMMARY OF THE INVENTION

According to one aspect of the present disclosure, a stroller is provided having a forward facing seat, a rearward facing seat, and a seat back. Although the stroller contains two seats, only one of the seats is generally capable of being occupied at one time. According to alternative embodiment stroller, both seats may be generally occupied at the same time.

According to one aspect of the present disclosure, a stroller is provided that is configured to support a child. The stroller includes a frame, a plurality of wheels supporting the frame, a forward facing seat supported by the frame, a rearward facing seat supported by the frame, and a seat back moveable between a rearward recline position to support a child reclining in the forward facing seat and a forward recline position to support a child reclining in the rearward facing seat.

According to another aspect of the present disclosure, a stroller is provided that is configured to support a child. The stroller includes a frame, a plurality of wheels supporting the frame, a forward facing seat supported by the frame, a rearward facing seat supported by the frame, a seat back positioned to support a child reclining in the forward facing seat, and a platform positioned rearward of the forward facing seat to support a child standing on the platform. The rearward facing seat is moveable between a use position and a storage position increasing access to the platform for a child to stand on the platform.

According to another aspect of the present disclosure, a stroller is provided that is configured to support a child. The stroller includes a frame, a plurality of wheels supporting the frame, and a rearward facing seat supported by the frame. The rearward facing seat is moveable between use and storage positions. The stroller further includes a seat back supported by the frame. The seat back is positioned to support the back of the child seated on the rearward facing seat in a rearward facing direction. The seat back is adjustable relative to the frame to provide a plurality of incline angles.

According to another aspect of the present disclosure, a stroller is provided that is configured to support a child. The stroller includes a frame, a plurality of wheels supporting the frame, a forward facing seat supported by the frame, a rearward facing seat supported by the frame, a seat back positioned to support a child reclining in the forward facing seat, and a platform positioned rearward of the forward facing seat to support a child standing on the platform. The platform has a forward edge and a rearward edge. The stroller further includes a canopy pivotally coupled to the frame at a location rearward of the forward edge of the platform.

The above mentioned and other features of the invention, and the manner of attaining them, will become more apparent and the invention itself will be better understood by reference to the following description of embodiments of the invention taken in conjunction with the accompanying drawing.

BRIEF DESCRIPTION OF THE DRAWINGS

The above-mentioned and other features of the disclosure, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the disclosure in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
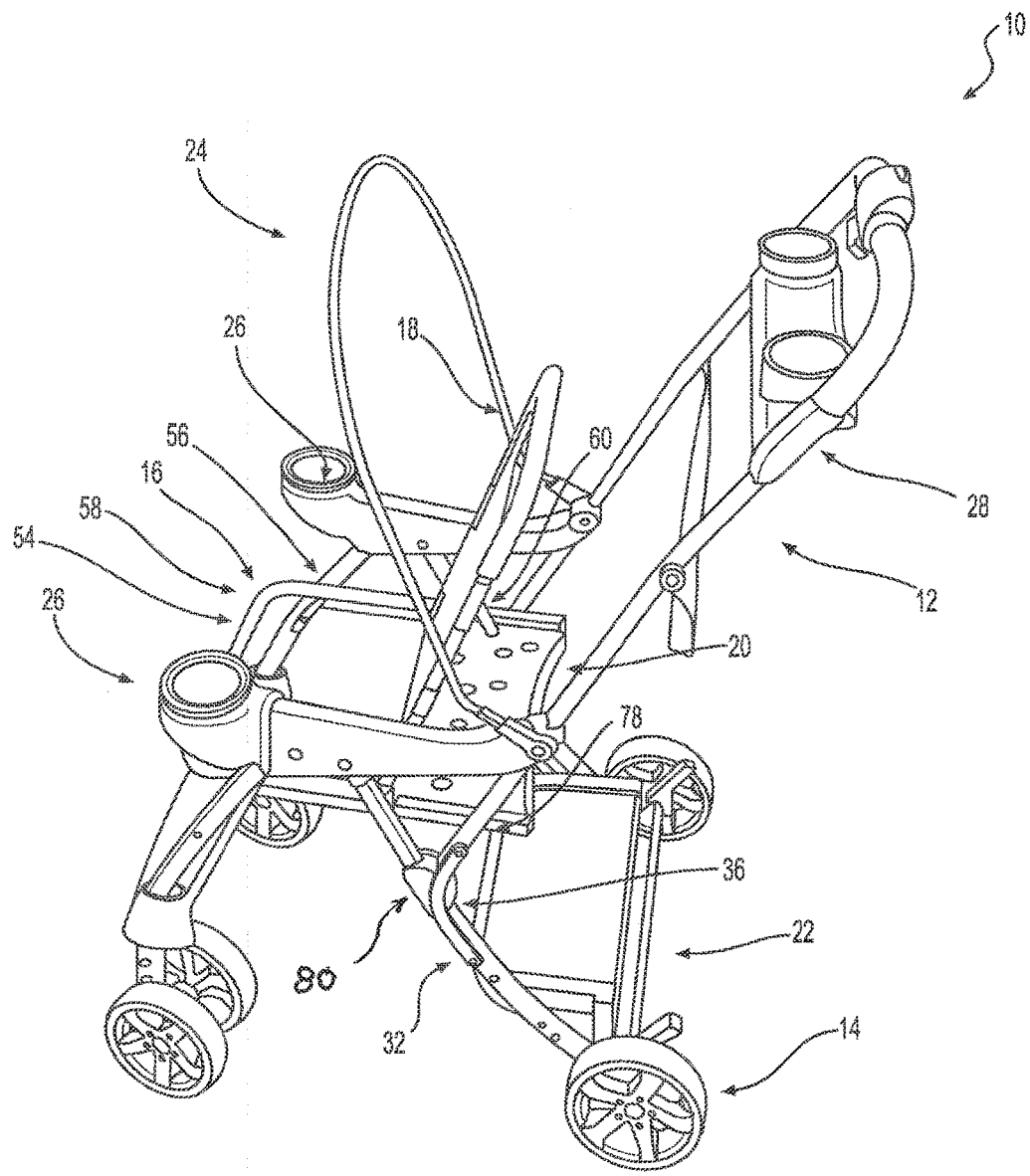
FIG. 1 is a perspective view of a stroller including a frame supported by a plurality of wheels, a forward facing front seat supported by the frame, a rearward facing back seat in a lowered position supported by the frame, a seat back positioned between the front seat and the back seat and reclined in a rearward direction for use by a child positioned on the front seat, and a platform positioned behind the back seat upon which a child may stand.

FIG. 1 shows an exemplary stroller 10. According to one embodiment of the present disclosure, components of stroller 10 can be moved to facilitate use of the stroller for a forward facing child, a rearward facing child, a standing child, or combinations of these uses.

Stroller 10 includes a frame 12, a plurality of wheels 14 supporting frame 12, a forward facing front seat 16, a seat back 18, a rearward facing back seat 20, a platform 22, and a canopy/canopy frame 24. Forward facing front seat 16 and rearward facing back seat 20 are the only seats provided on stroller 10 so that forward facing seat 16 is the forward-most seat and rearward facing seat 20 is the rearward-most seat of stroller 10. According to alternative embodiments, additional seats may be provided between forward facing seat 16 and rearward facing seat 20.

Figure 4:
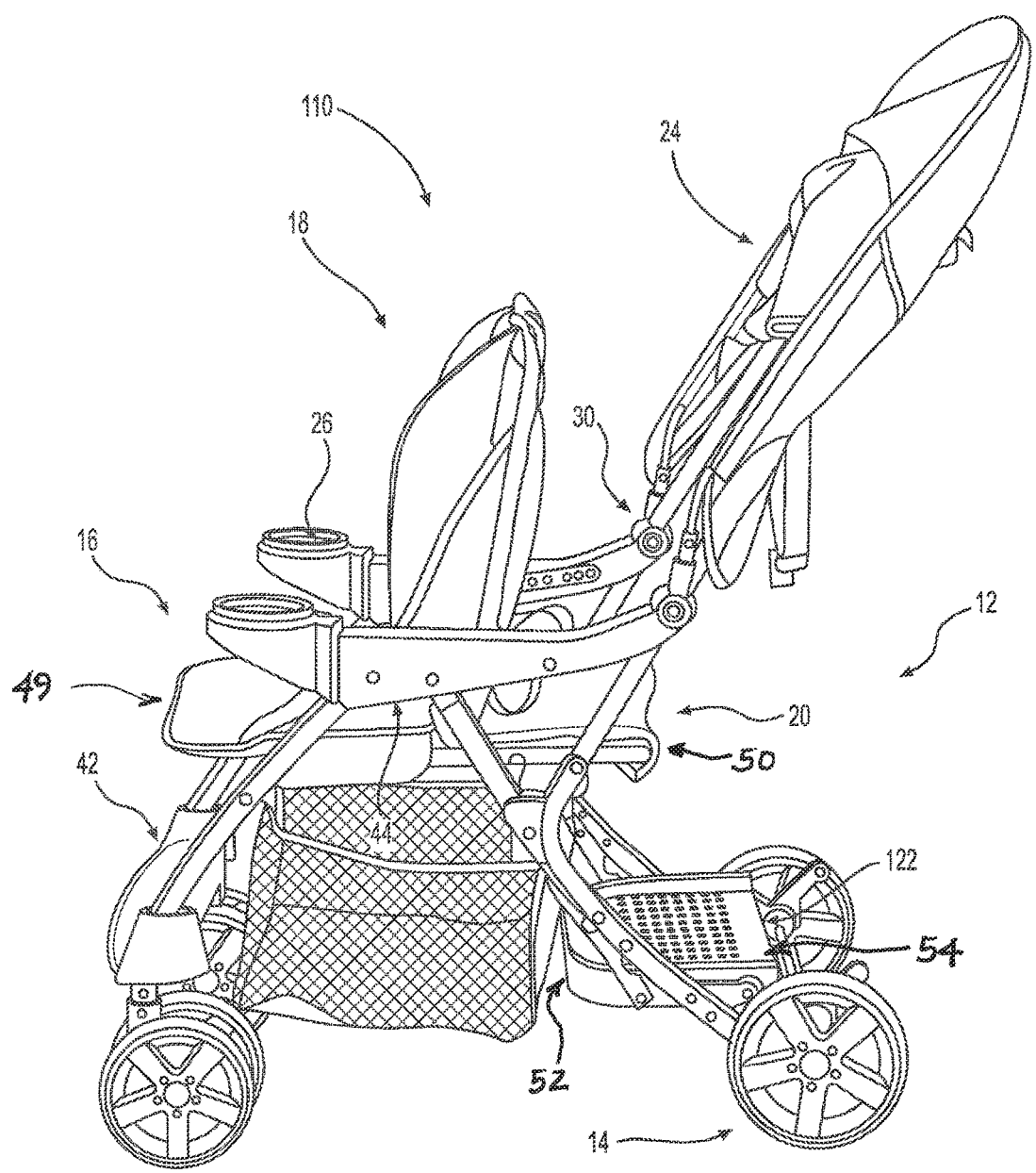
FIG. 4 is a perspective view of a stroller substantially similar to the stroller of FIG. 1 showing stroller including soft components, such as fabric and netting, and the seat back reclined in a rearward direction.

Frame 12 has a longitudinal axis extending forward and rearward. Rearward facing back seat 20 is preferably longitudinally positioned between seat back 18 and platform 22 (see also FIG. 4 showing rearward facing back seat 20 longitudinally positioned between seat back 18 and platform 122).

As shown in FIG. 1, seat back 18 is in a rearward recline position to support the back of a child sitting on front seat 16. When in the rearward recline position, a majority of seat back 18 is positioned directly above rearward facing back seat 20 (see also FIG. 4). A child may stand on platform 22 and grasp seat back 18 for additional support. Canopy frame 24 is rotated to a forward position to provide covering for the child sitting on front seat 16.

Figure 2:
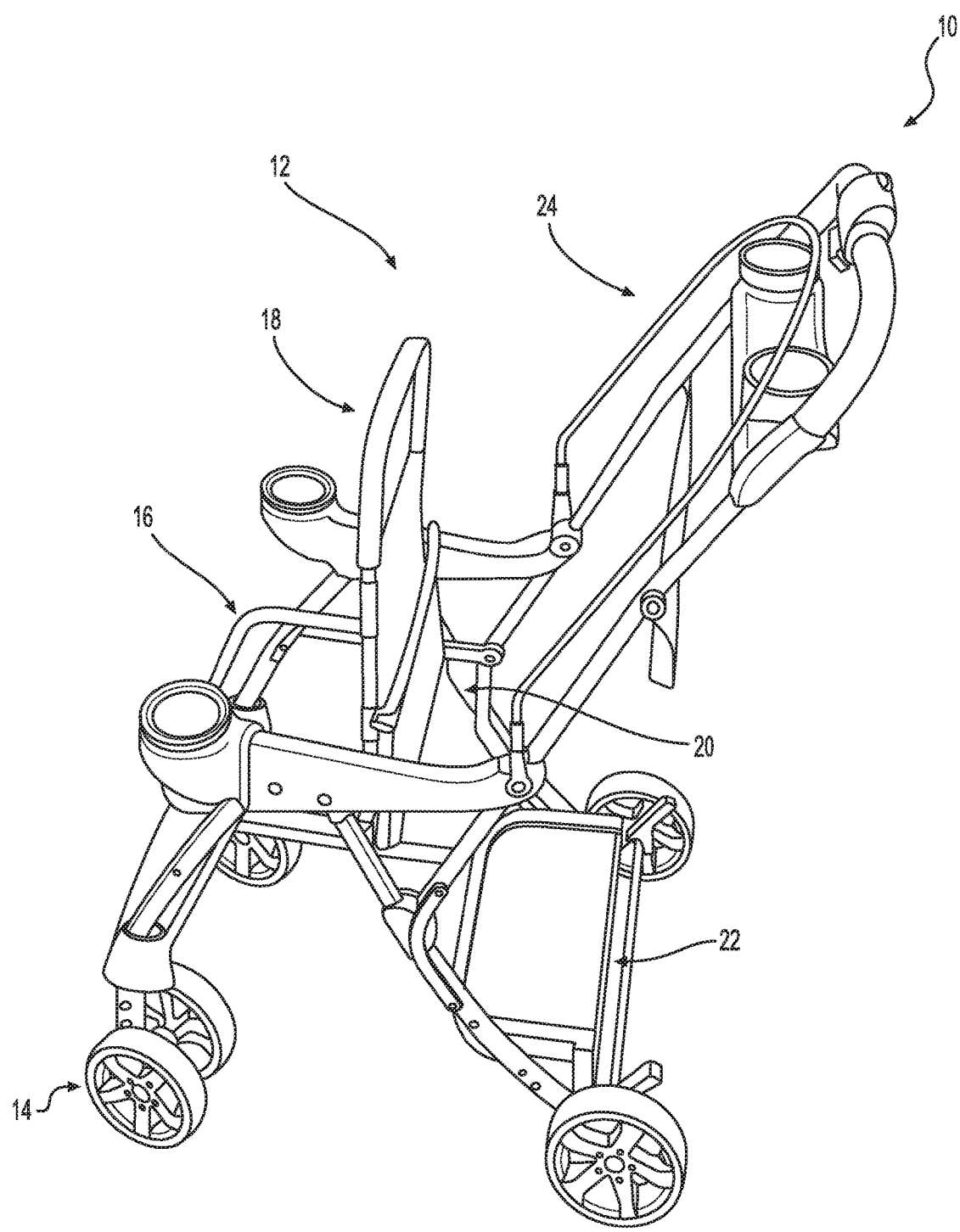
FIG. 2 is a view similar to FIG. 1 of the stroller of FIG. 1 showing the seat back in a vertical position to provide a hand grips for a child standing on the platform and the back seat moved to a raised position to provide additional room for the child standing on the platform.

Rearward facing back seat 20 is pivotally coupled to frame 12 to move between a lowered use position, as shown in FIG. 1, and a raised storage position, as shown in FIG. 2. When in the raised storage position, back seat 20 provides additional clearance for a child standing on platform 22. When in the lowered use position, at least a portion of rearward facing back seat 20 is positioned directly above platform 22 (see also FIG. 4 showing at least a portion of rearward facing back seat 20 positioned directly above platform 122).

Similarly, seat back 18 is movable to a vertical position to provide additional clearance for the child standing on platform 22. A child may grasp seat back 18 for additional support. Canopy frame 24 is shown in FIG. 2 rotated to a rear position to avoid obstructing the view of the child standing on platform 22.

Figure 3:
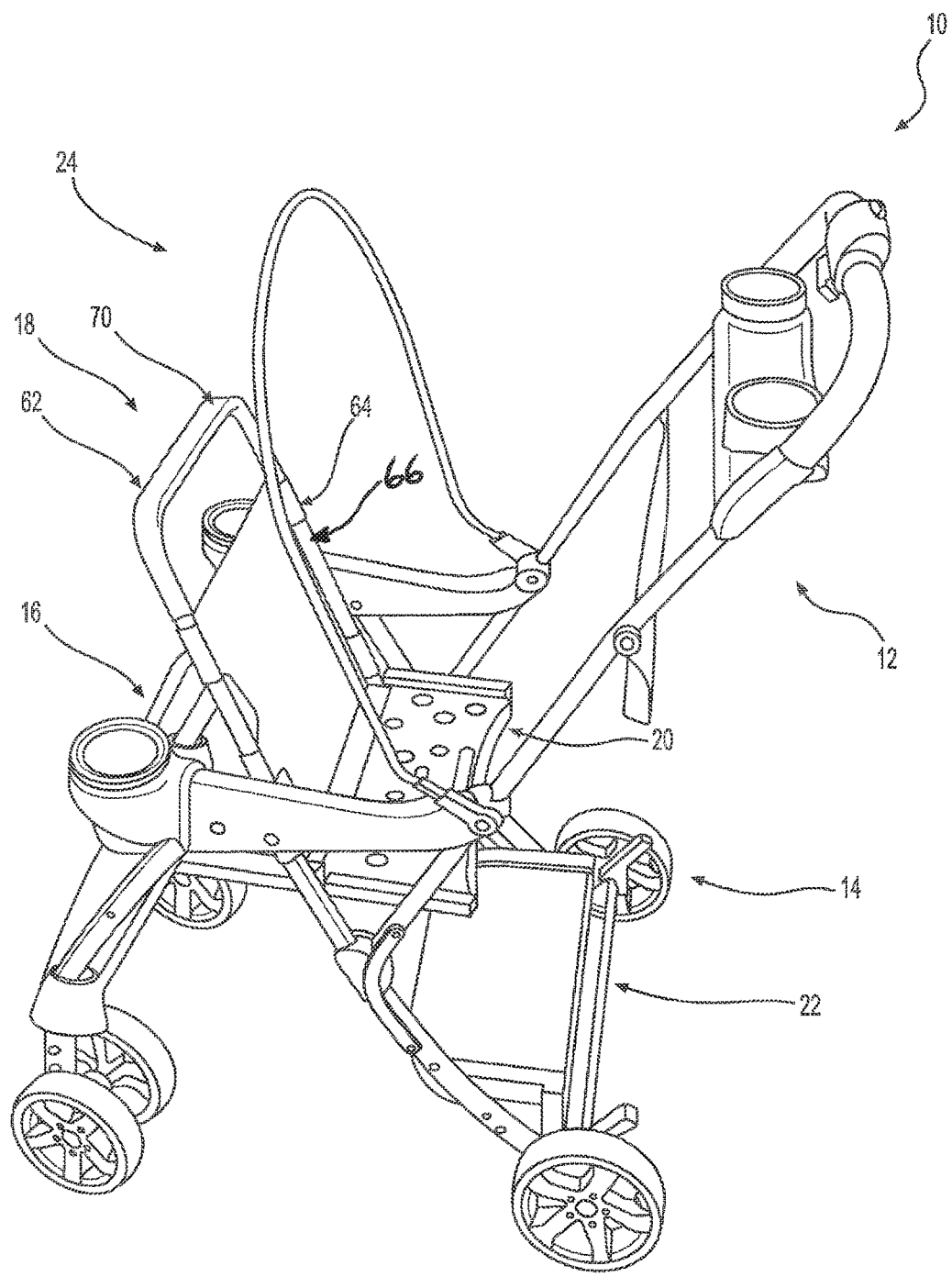
FIG. 3 is a view similar to FIG. 1 of the stroller of FIG. 1 showing the back seat in the lowered position and the seat back reclined in a forward direction for use by a child positioned on the rear seat.

As shown in FIG. 3, back seat 20 is in the lowered use position and seat back 18 is in a forward recline position to support the back of a child sitting on back seat 20. When in the forward recline position, a majority of seat back 18 is positioned directly above forward facing seat 16 (see also FIG. 5). Canopy frame 24 is rotated to the forward position to provide covering for the child setting on rear seat 20.

Figure 9:
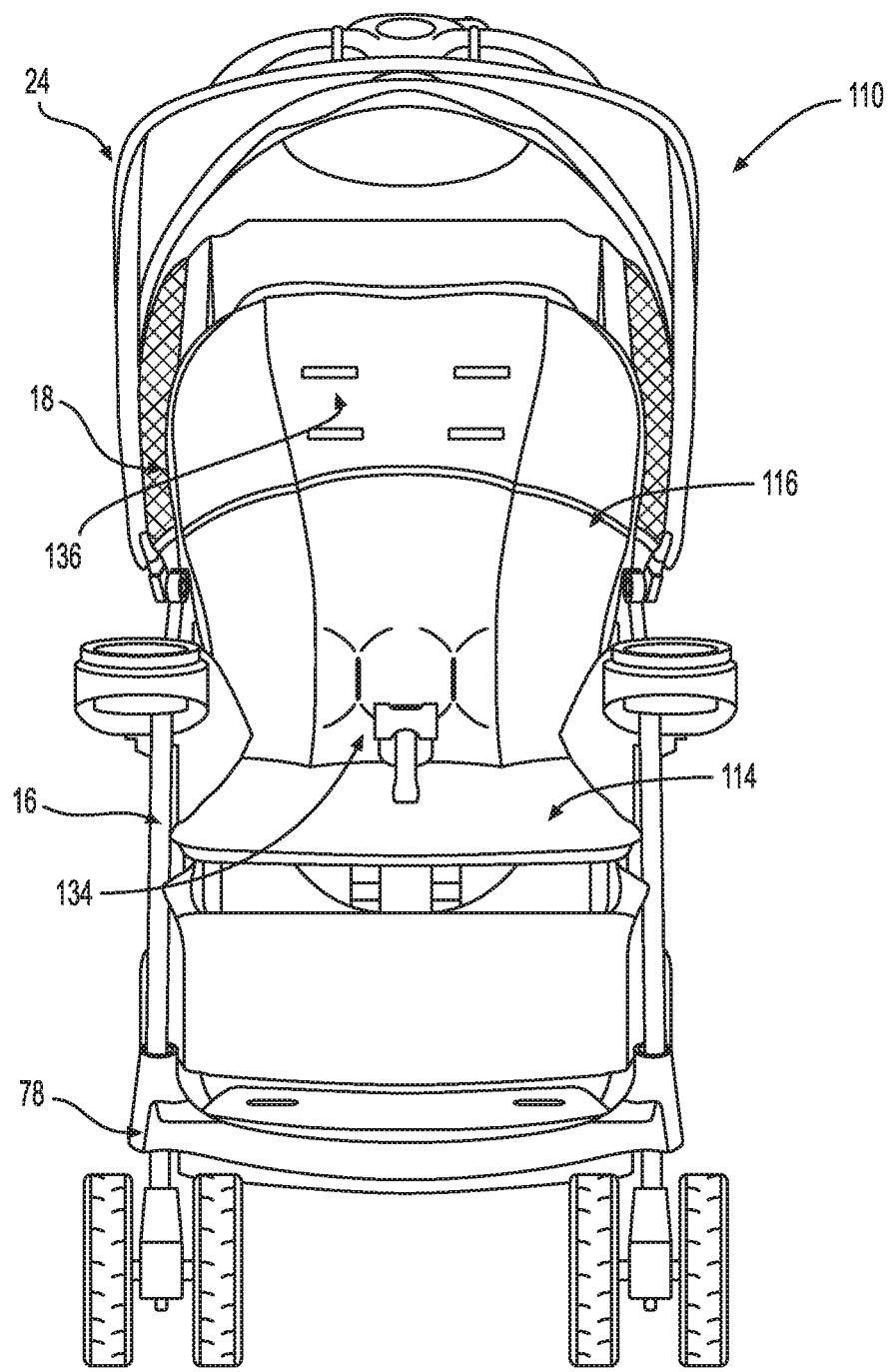
FIG. 9 is a front elevation view of the stroller of FIG. 4 showing the seat back and back seat in the positions of FIG. 4.

Frame 24 includes a pair of upper rails 26, a U-shaped handle member 28 pivotally coupled to upper rails 26 at rear ends 30 (see FIG. 4) of upper rails 26, a pair of rear legs 32 pivotally coupled to upper rails 26 at upper ends 34 (see FIG. 5) of rear legs 32, a pair of pivot links 36 coupled to lower ends 38 (see FIG. 11) of handle member 28 and middle portions 40 (see FIG. 11) of rear legs 32, a pair of front legs 42 (see FIG. 4) pivotally coupled to a mid portion 44 of upper rails 26, and a pair of lower rails 46 (see FIG. 6) pivotally coupled to mid portions 48 of front legs 42 and lower ends 38 of handle member 28 at the pivot location with pivot links 36. A front cross bar (not shown) is positioned under front foot rest 78 (see FIG. 9) and a rear cross bar (not shown) under a rear end of platform 22 extends between respective front and rear legs 42, 32 to provide lateral stability. Rear wheels 14 are coupled to lower ends of rear legs 32 and front wheels 14 are coupled to lower ends of front legs 42.

Front seat 16 includes a U-shaped frame 54 (see FIG. 1) positioned above and coupled to lower rails 46. Front seat 16 also includes fabric (not shown in FIGS. 1-3) supported by legs 56 and bight 58 of U-shaped frame 54 to support a child seating on front seat 16.

Seat back 18 is pivotally coupled to ends 60 of legs 56 of U-shaped frame 54. Seat back 18 includes a U-shaped frame 62 (see FIG. 3) and fabric 64 supported by legs 66 of U-shaped frame 62. Portions 68 (see FIG. 10) of bight 70 of frame 62 are not covered by fabric 64 so a child standing on platform 22 can completely wrap their hands around portions 68 to provide support (see FIGS. 10, 20, and 21). Bight 70 of frame 62 is preferably covered with a foam tube 72 (see FIG. 10) to provide compliant grips for the child.

Back seat 20 is pivotally connected to lower rails 46 to move between the raised and lowered positioned discussed above. Back seat 20 is preferably made of rigid plastic material.

Canopy frame 24 is pivotally coupled to handle member 28 and upper rails 26 at the connection of handle member 28 and upper rails 26 to move between the forward and rearward positions discussed above.

Platform 22 extends between and is coupled to rear legs 32. A pair of links 74 (see FIG. 20) extend from mid portions of rear legs 32 down to sides of platform 22 to provide support for the front portion of platform 22. Each link 74 includes an upper link pivotally coupled to the rear leg and a lower link pivotally coupled to the lower end of the upper link and to platform 22 (see FIG. 11). Another link 75 extends between the lower end of rear legs 32 and a rear of platform 22 to pivotally couple platform 22 to rear legs 32.

According to one embodiment of the present disclosure, frame 12 is collapsible from the use position shown in FIGS. 1-3. To collapse stroller 10, a user squeezes button 76 on handle member 28 to disengage latch members (not shown) extending from respective lower ends 38 of handle member 28. The latch members are withdrawn into lower ends 38 so they no longer maintain engagement with latch receivers 80 coupled to rear legs 32. As a result of the disengagement, handle member 28 is able to move relative to lower legs 32 about pivot links 36 and relative to upper rails 26 about the pivotal connection therebetween. Similarly, other frame components are able to move relative to each other allowing frame 12 to move to a collapsed position.

FIGS. 4-23 illustrate a stroller 110 that is substantially the same as stroller 10 of FIG. 1-3. Identical or substantially similar components between stroller 10 and stroller 110 are provided with the same reference number. One difference between stroller 110 and stroller 10 is that platform 122 of stroller 110 is wider than platform 22 of stroller 10. For example, a leading edge 178 (see FIG. 5) of platform 122 is directly below the intersection of U-shaped handle member 28 and rear legs 32 and a leading edge 78 of platform 122 is positioned rearward of this junction as shown in FIG. 1.

Figure 6:
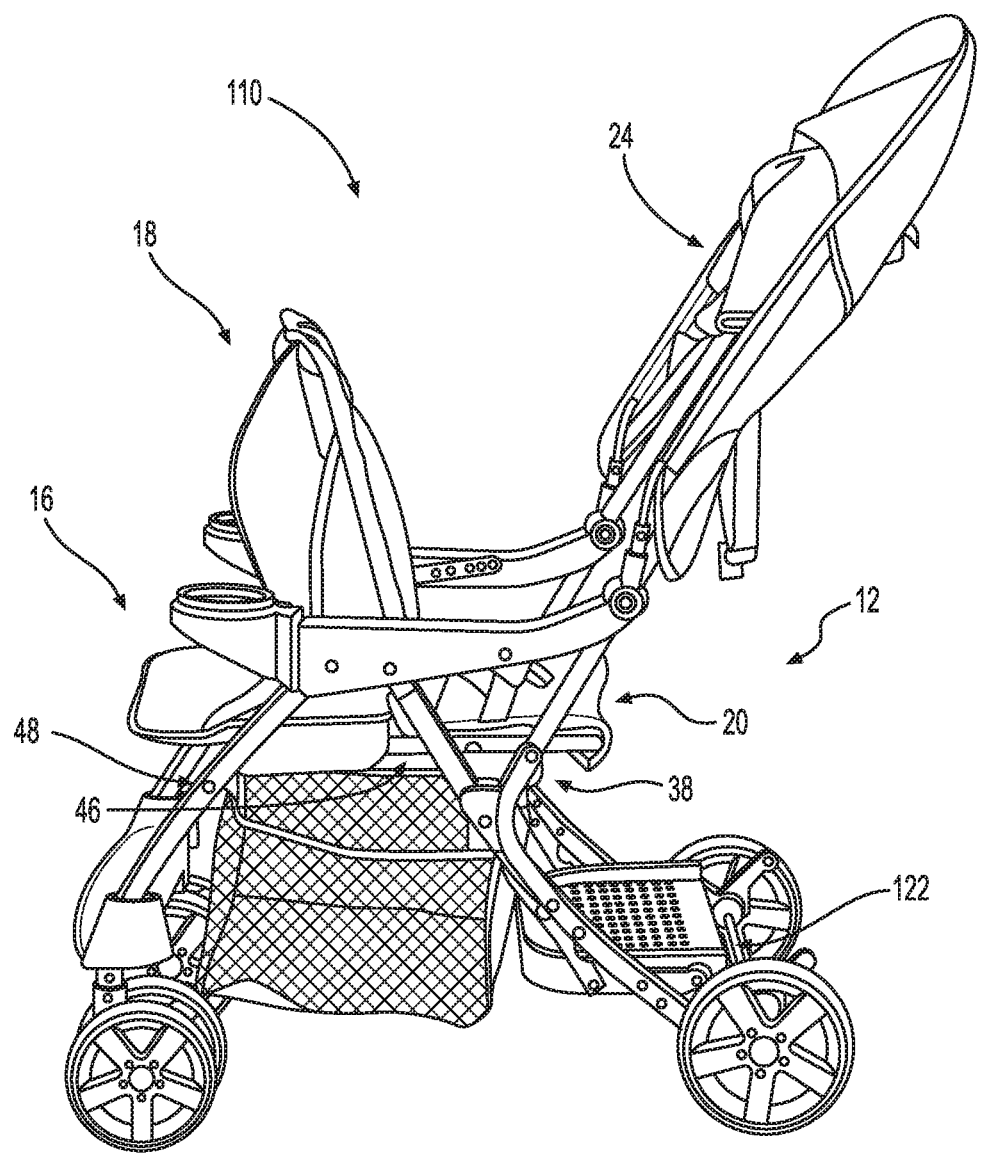
FIG. 6 is a perspective view of the stroller of FIG. 4 showing the back seat in the lowered position and the seat back reclined in a forward direction for use by a child positioned on the rear seat

As shown in FIGS. 4 and 6, forward facing seat 16 and seat back 18 cooperate to define a forward angle A and rearward facing seat 20 and seat back 18 cooperate to define a rear angle B. When seat back 18 is in the rearward recline position (See FIG. 4), forward angle A is obtuse and rear angle B is acute. When seat back 18 is in the forward recline position (See FIG. 6), forward angle A is acute and rear angle B is obtuse. Forward angle A and rearward angle B cooperate to define a combined angle of about 180 degrees when seat back 18 is in either the forward or rearward recline positions.

Figure 5:
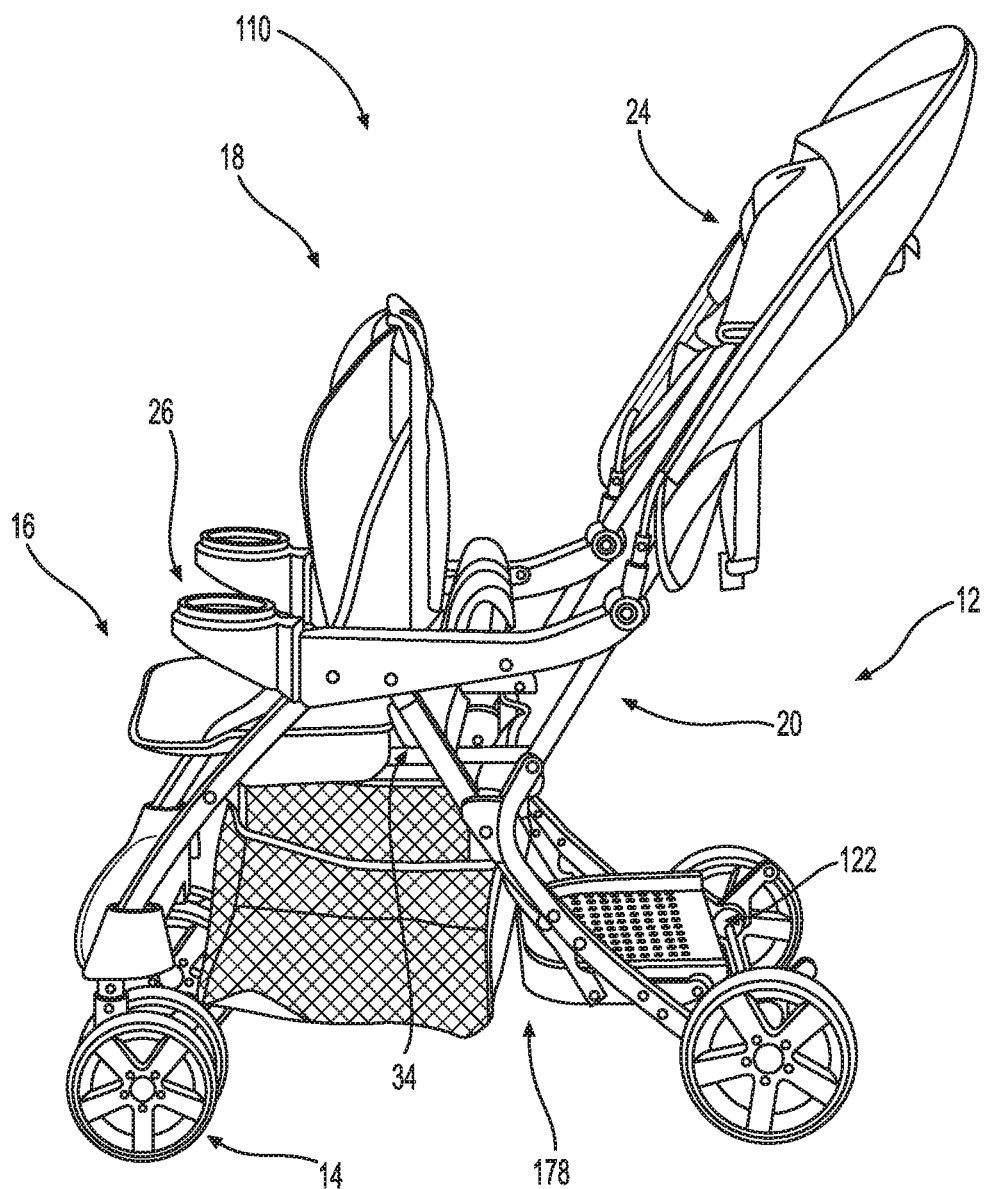
FIG. 5 is a perspective view of the stroller of FIG. 4 showing the seat back in a vertical position to provide a hand grips for a child standing on the platform and the back seat moved to a raised position to provide additional room for the child standing on the platform.

As shown in FIG. 4, forward facing seat 16 has a first open edge 49 configured to permit a child sitting on forward facing seat 16 (see FIG. 18) to position their legs over first open edge 49 and rearward facing seat 20 has a second open edge 50 configured to permit a child sitting on rearward facing seat 20 (see FIG. 22) to position their legs over second open edge 50. Platform 122 has a forward edge 52 and a rearward edge 54. Second open edge 50 is positioned rearward of forward edge 52 of platform 122 when rearward facing seat 20 is in the raised use position and second open edge 50 is positioned forward of forward edge 52 of platform 122 when rearward facing seat 20 is in the storage position (see also platform 22 discussed above). As shown in FIGS. 4 and 5, second open edge 50 is positioned at a first lower height when rearward facing seat 20 is in the lowered use position than when rearward facing seat 20 is in the raised storage position.

As shown in FIG. 4, rearward facing seat 20 longitudinally overlaps platform 122 by a first amount when rearward facing seat 20 is in the use position. As shown in FIG. 5, rearward facing seat 20 longitudinally overlaps platform 122 by a second amount (i.e. zero) when rearward facing seat 20 is in the storage position that is less than amount shown in FIG. 4. According to the preferred embodiment of the present disclosure, the first amount of overlap is greater than 25% of a longitudinal length of platform 122 (see also platform 22 discussed above). According to one embodiment, the first amount of overlap is about 50% of the longitudinal length of platform 122. According to other embodiments, the first amount of overlap may be other percentages, such as 5%, 10%, 20%, 30%, 40%, 60%, 75%, 100%, 150%, or 200% of the longitudinal length of platform 122.

As shown in FIG. 4, rearward facing seat 20 longitudinally overlaps platform 122 when rearward facing seat 20 is in the lowered use position. Seat back 18 longitudinally overlaps rearward facing seat 20 when in the rearward recline position. Seat back 18 longitudinally overlaps forward facing seat 16 when in the forward recline position. Seat back 18 is substantially parallel with rearward facing seat 20 when rearward facing seat 20 is in the raised storage position and seat back 18 is inclined at a substantially vertical position as shown in FIG. 5. When in the position shown in FIG. 5, rear angle B is about zero degrees. As mentioned above, rear angle B may be greater than 90 degrees as shown in FIG. 6.

Figure 19:
FIG. 19 is a view similar to FIG. 18 showing the canopy in a forward positions.
Figure 20:
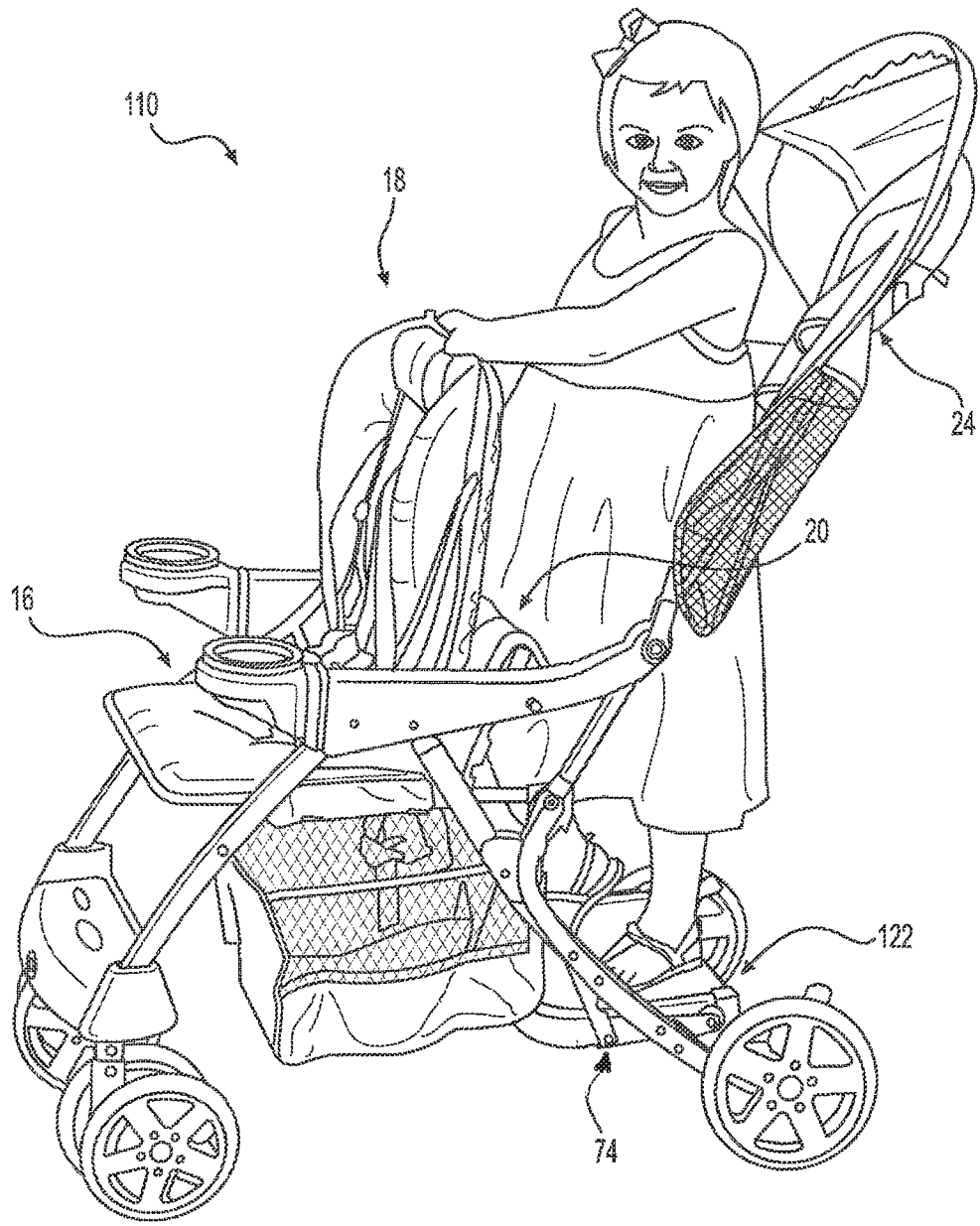
FIG. 20 is view similar to FIG. 5 showing a child standing on the platform and holding onto the seat back.
Figure 21:
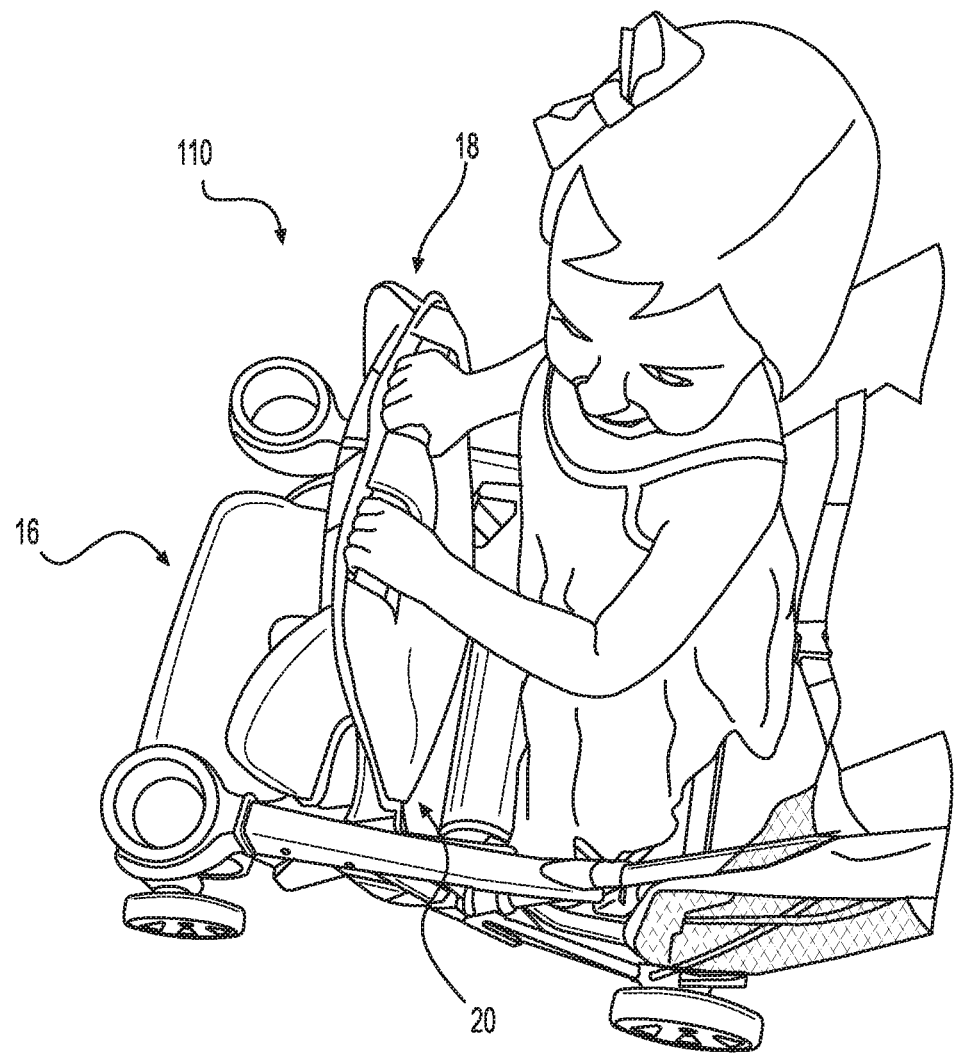
FIG. 21 is a top perspective view of the stroller of FIG. 4 showing a child standing on the platform and holding onto the seat back.
Figure 22:
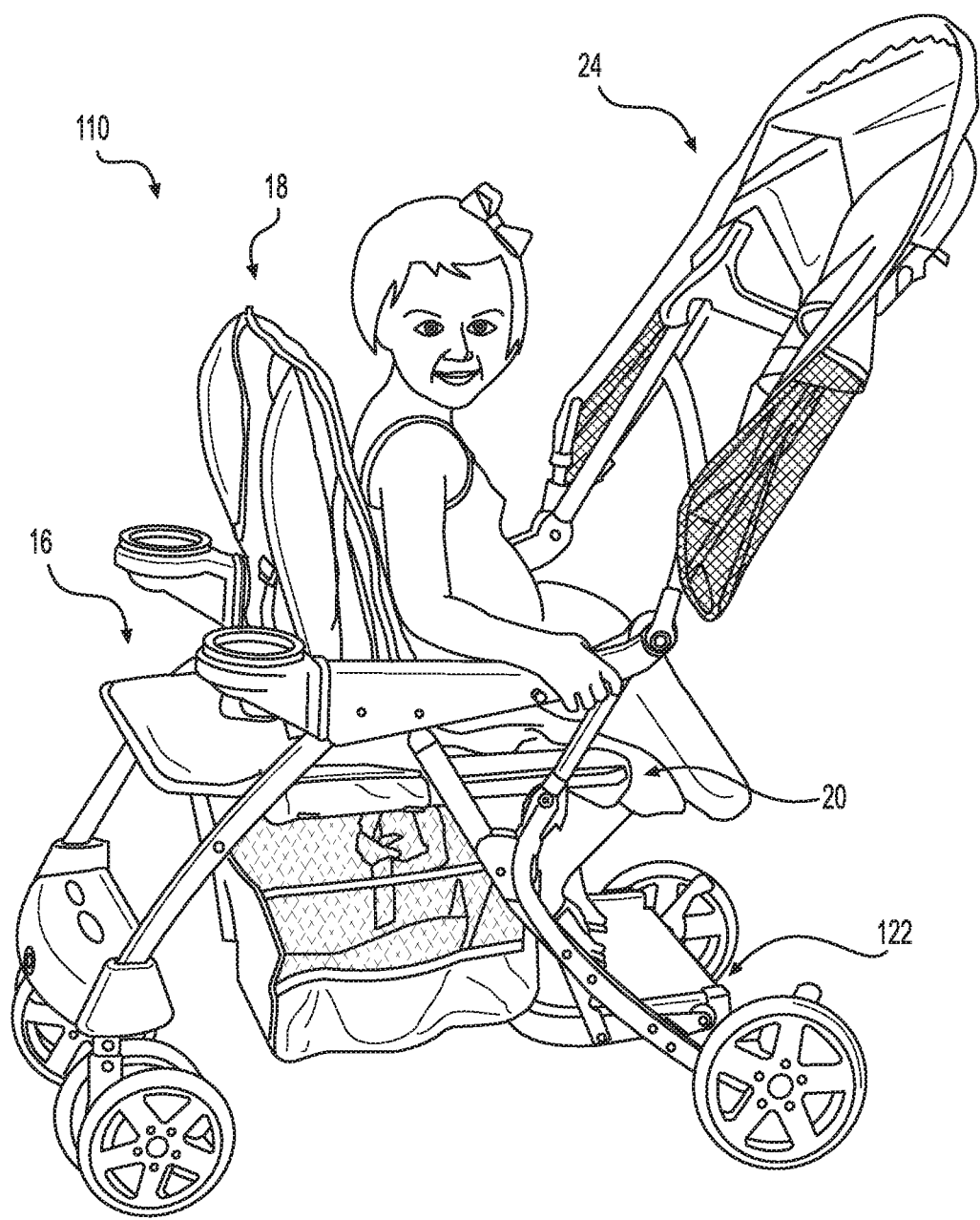
FIG. 22 is a view similar to FIG. 6 showing a child sitting in the rear seat of the stroller with the canopy in the rear position.
Figure 23:
FIG. 23 is a view similar to FIG. 22 showing the canopy in the forward position.

As shown in FIG. 19, canopy 24 has a forward edge 56. Forward edge 56 of the canopy 24 is positioned forward of seat back 18 when in the use position and forward edge 56 of canopy is positioned rearward of platform 122 when in the storage position as shown in FIG. 20. Canopy 24 completely covers rearward facing seat 20 when in the use position and at least partially covers forward facing seat 16 when in the use position.

Figure 7:
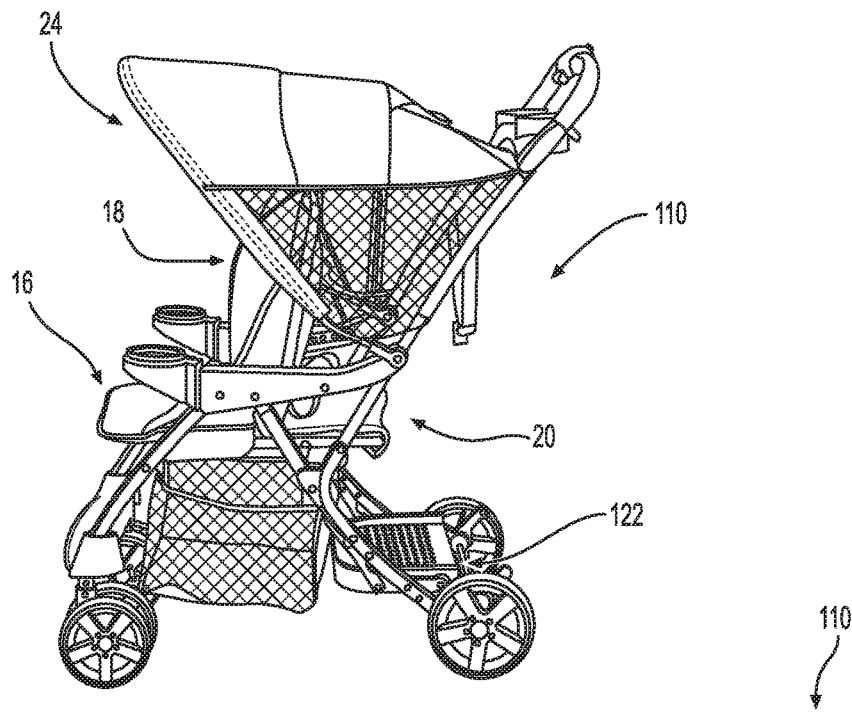
FIG. 7 is view similar to FIG. 4 showing the canopy raised to cover a child positioned in the front seat.
Figure 8:
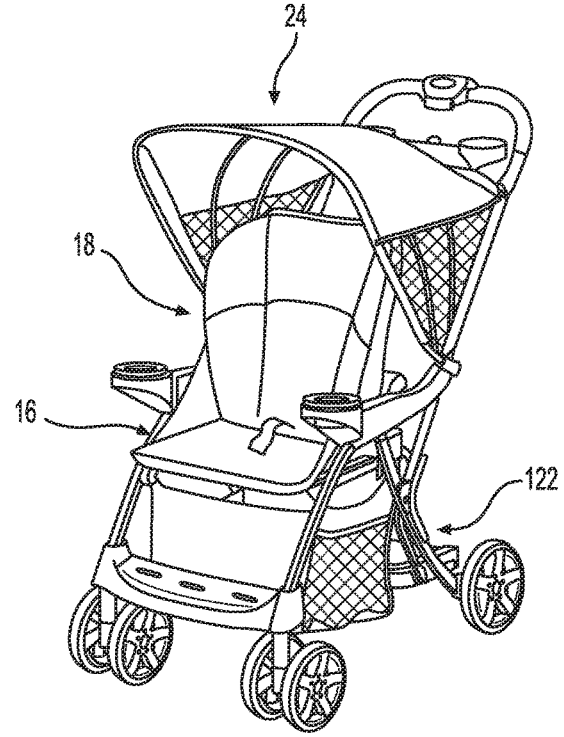
FIG. 8 is a front perspective view of the stroller of FIG. 4 showing the seat back and back seat in the positions of FIG. 4.
Figure 10:
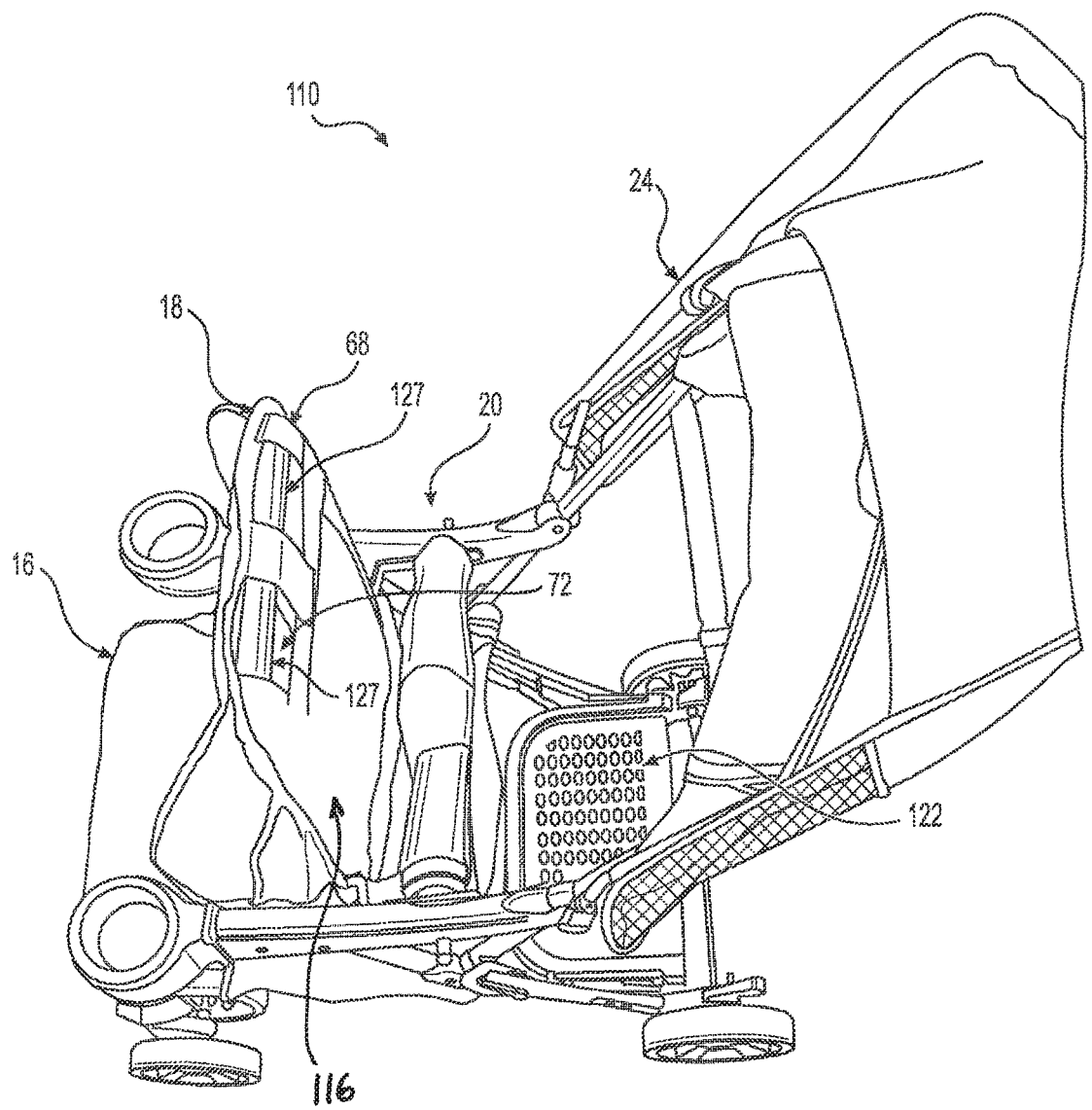
FIG. 10 is a top perspective view of the stroller of FIG. 4 showing the seat back and the back seat is the position shown in FIG. 5.
Figure 11:
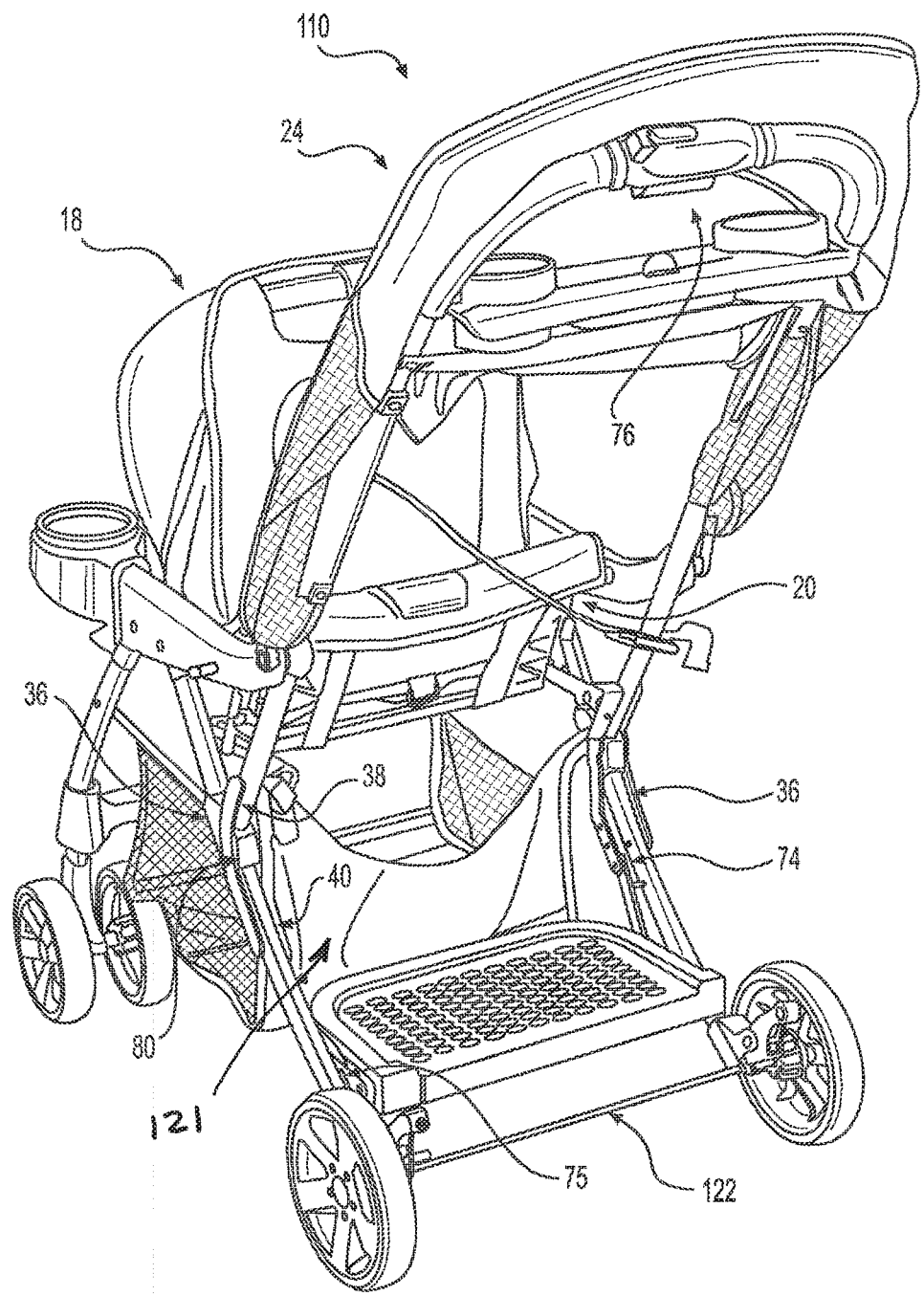
FIG. 11 is rear perspective view of the stroller of FIG. 4 showing the seat back and back seat in the positions shown in FIG. 5.
Figure 12:
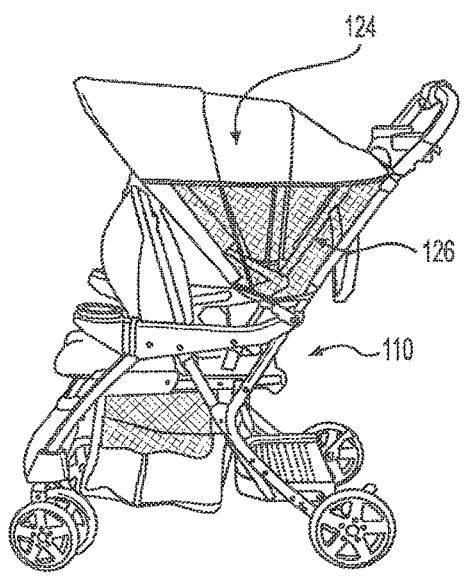
FIG. 12 is a view similar to FIG. 6 showing the canopy raised to cover a child positioned in the rear seat.
Figure 13:
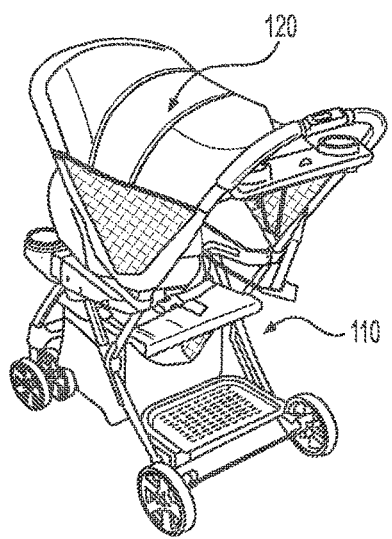
FIG. 13 is a rear perspective view of the stroller of FIG. 4 showing the seat back and back seat in the positions shown in FIG. 6 and the canopy in the raised position.

As shown in FIGS. 4-23, stroller 110 includes soft components. These soft components may be provided on stroller 10. The soft components include fabric and padding 114 (see FIG. 9) of front seat 16, fabric and padding 116 of seat back 18, fabric and padding 118 (FIG. 15) of rear seat 20, fabric 120 (FIG. 13) positioned over canopy frame 24, and basket 121 (FIG. 11). Canopy fabric 120 is coupled to U-shaped handle member 28 and expands and contracts as canopy frame 24 is moved between the forward and rear positions as shown in FIGS. 7 and 10. Canopy fabric 120 includes a generally opaque top 124 (FIG. 12) and see-through mesh side panels 126 positioned so that a child sitting in either of seats 16, 20 can see through side panels 126.

As shown in FIG. 10, fabric and padding 116 of seat back 18 includes a pair of pockets 127 that expose portions 68 of U-shaped frame 62 of seat back 18 to expose portions of foam tube 72 to be grasped by a child standing on platform 122.

Figure 16:
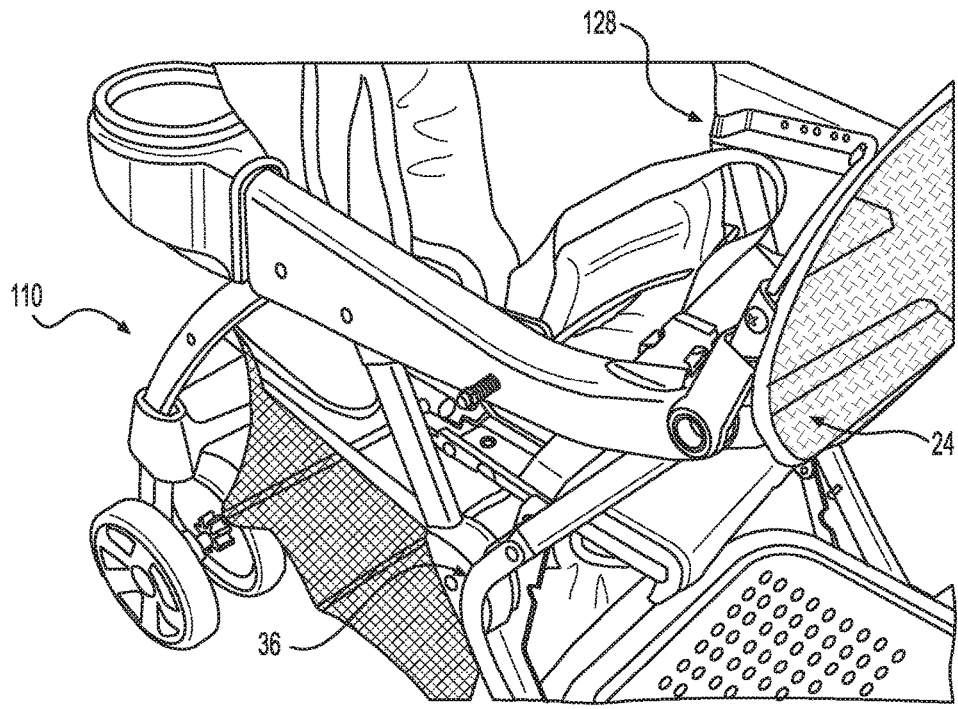
FIG. 16 is a top perspective view of the stroller of FIG. 4 showing the seat back inclined in the forward direction.
Figure 17:
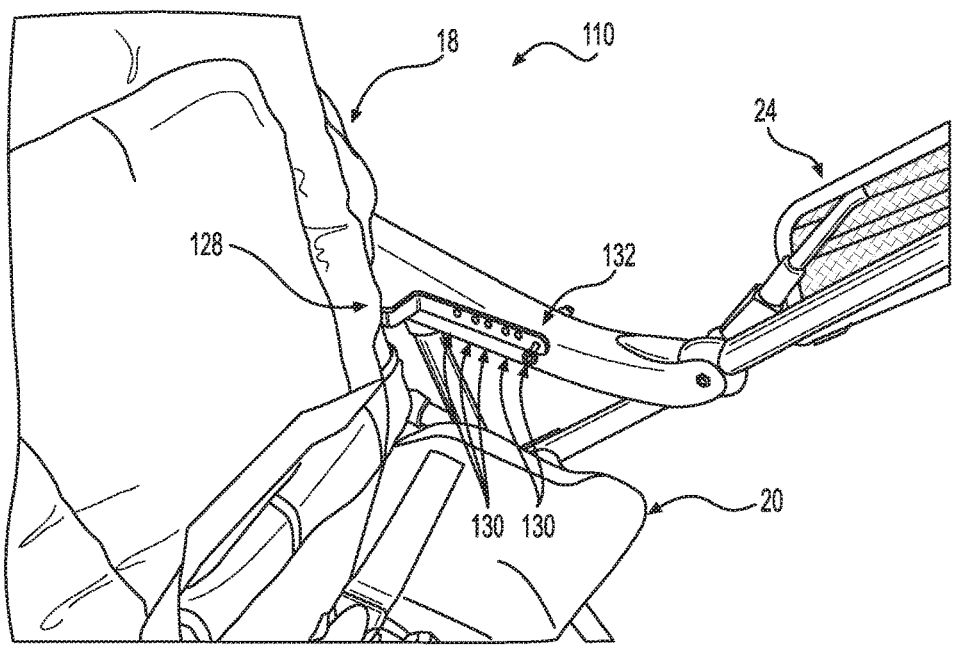
FIG. 17 is another perspective view of the stroller of FIG. 4 showing the seat back included in the forward direction.
Figure 18:
FIG. 18 is a view similar to FIG. 4 showing a child sitting in the front seat of the stroller with the canopy in a rear position

As shown in FIGS. 16 and 17, seat back 18 includes a pair of brackets 128 that include a plurality of apertures 130. Upper rails 26 include spring biased pins 132 that are received in one of apertures 130 in one of seven positions corresponding to apertures 130. To move seat back 18, pins 132 are withdrawn from the respective apertures 130 to allow brackets 128 and the remainder of seat back 18 to pivot on frame 12. Once seat back 12 is in the desired position, the user releases pins 132 and they extend into the newly selected apertures 130 to hold brackets 128 and the remainder of seat back 18 against pivoting.

Figure 14:
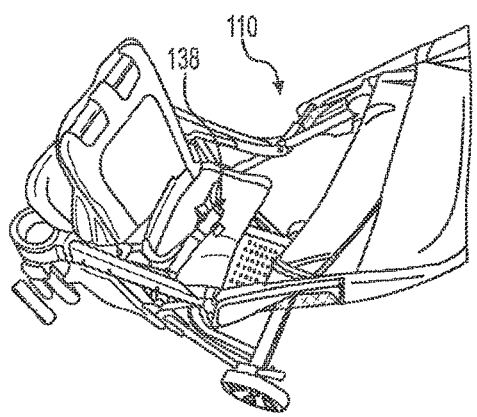
FIG. 14 is top perspective view of the stroller of FIG. 4 showing the seat back and back seat in the positions shown in FIG. 6 and the canopy in the lowered position.
Figure 15:
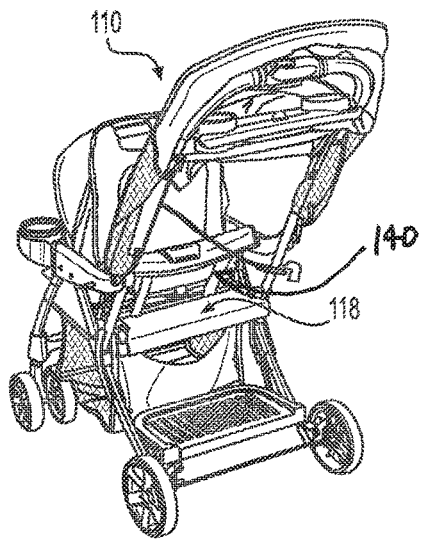
FIG. 15 is a rear perspective view of the stroller of FIG. 4 showing the seat back and back seat in the positions shown in FIG. 6 and the canopy in the lowered position.

According to one embodiment of the present disclosure, front seat 16 is provided with a five-point harness and rear seat 16 is provided with a three point harness. The five-point harness includes a buckle 134 (FIG. 9) attached to fabric 114 by a crotch strap and a pair of shoulder and thigh straps (not shown) that extend from lateral sides of fabric 114 through buckle 134 and through selected slots 136 in seat back fabric 116. The three-point harness includes a buckle 138 (FIG. 14)

attached to rear seat fabric 118 (FIG. 15) by a crotch strap and a pair of side straps 140 extending from a lateral side of fabric 118 to buckle 138 that couple to buckle 138 with pinch buckles.

FIGS. 4-17 show stroller 110 without a child. FIGS. 18-23 show stroller 110 with a child to illustrate where a child may be placed for sitting and where they may be placed for standing on stroller 110.

Figure 24:
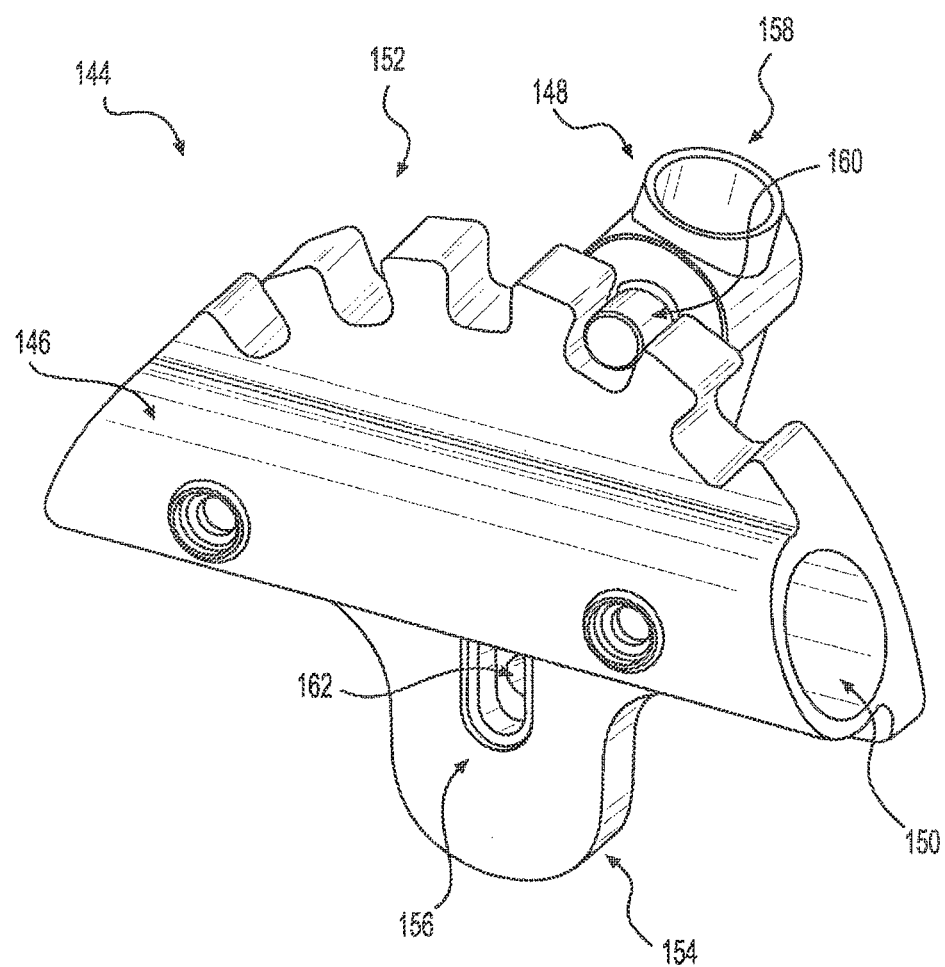
FIG. 24 is perspective view of an alternative embodiment recline mechanism.

An alternative embodiment recline mechanism 144 is shown in FIG. 24. Both of the provided recline mechanisms 144 include a base 146 and a seat back receiver 148. Base 146 includes a tubular aperture 150 for receiving a leg of front seat frame 54, a plurality of notches 152, and a downwardly extending tab 154 having a slot 156. Receiver 148 includes a tubular aperture 158 for receiving a respective leg 66 of seat back 18, a post 160 received in one of notches 152, and a lower aperture 162 that receives a fastener (not shown) that extends through slot 156 and lower aperture 162 to secure receiver 148 to base 146. To adjust the recline angle of seat back 18, a user pulls up on seat back 18 so that the fastener rides up in slot 156 and permits removal of post 160 from the respective notch 152. The user then rotates seat back 18 about the fastener until seat back 18 is at the desired recline or vertical position and releases seat back 18. Gravity then pulls seat back 18 down and forces post 160 into one of notches 152 so that post 160 maintains the angle of recline.

According to one embodiment of the present disclosure, strollers 10, 110 are configured to support only a single child. For example, when seat back 18 is reclined for use by a child sitting in front seat 16, a child cannot comfortably sit in rear seat 20 because seat back 18 encroaches into the occupant space of rear seat 20. Similarly, if seat back 18 is positioned in the vertical position to permit rear seat 20 to be raised and free up the occupant space above respective platforms 22, 122, the respective rear seats 20 are unusable because they are in an unusable storage position and front seat 16 is unusable because seat back 18 encroaches into the occupant space of front seat 16. Finally, if respective rear seats 20 are in the lowered use position and the respective seat backs 18 are reclined forward, the respective rear seats 20 encroach on the occupant spaces of the respective platforms 22, 122 and seat backs 18 encroaches on the respective occupant space of respective front seats 16. According to alternative embodiments of the present disclosure, additional seats such as front seat 16 and a corresponding seat back 18 may be provided to facilitate a second child.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains.

The invention claimed is:

1. A stroller configured to support a child including
a frame,
a plurality of wheels supporting the frame,
a forward facing seat supported by the frame,
a rearward facing seat supported by the frame,
and a seat back moveable between a rearward recline position to support a child reclining in the forward facing seat and a forward recline position to support a child reclining in the rearward facing seat,
wherein a majority of the seat back is positionable directly above the rearward facing seat when the seat back is in the rearward recline position and a majority of the seat back is positionable directly above the forward facing seat when the seat back is in the forward recline position; and
further comprising a platform positioned rearward of the forward facing seat to support a child standing on the platform, wherein the rearward facing seat is moveable between a use position and a storage position increasing access to the platform for a child to stand on the platform.

2. The stroller of claim 1, wherein the forward facing seat is the forward-most seat of the stroller and the rearward facing seat is the rearward-most seat of the stroller.

3. The stroller of claim 1, wherein the forward facing seat and the seat back cooperate to define a forward angle, the rearward facing seat and the seat back cooperate to define a rear angle, the forward angle is obtuse when the seat back is in the rearward recline position, the rear angle is acute when the seat back is in the rearward recline position, the forward angle is acute when the seat back is in the forward recline position, and the rear angle is obtuse when the seat back is in the rearward recline position.

4. The stroller of claim 3, wherein the forward angle and the rear angle cooperate to define a first combined angle when the seat back is in the rearward recline position and the forward angle and the rear angle cooperate to define a second combined angle when the seat back is in the forward recline position, and the first and second combined angles are equal.

5. The stroller of claim 4, wherein the first and second combined angles are about 180 degrees.

6. A stroller configured to support a child including
a frame,
a plurality of wheels supporting the frame,
a forward facing seat supported by the frame,
a rearward facing seat supported by the frame,
a seat back positioned to support a child reclining in the forward facing seat, and
a platform positioned rearward of the forward facing seat to support a child standing on the platform, the rearward facing seat being moveable between a use position and a storage position increasing access to the platform for a child to stand on the platform.

7. The stroller of claim 6, wherein a least of portion of the rearward facing seat is positioned directly above the platform.

8. The stroller of claim 6, wherein the frame has a longitudinal axis and the rearward facing seat in substantially positioned longitudinally between the seat back and the platform.

9. The stroller of claim 6, wherein the forward facing seat has an first open edge configured to permit a child sitting on the forward facing seat to position their legs over the first open edge and the rearward facing seat has a second open edge configured to permit a child sitting on the rearward facing seat to position their legs over the second open edge, the platform has a forward edge and a rearward edge, the second open edge is positioned rearward of the forward edge of the platform when the rearward facing seat is in the use position, and the second open edge is positioned forward of the forward edge of the platform when the rearward facing seat is in the storage position.

10. The stroller of claim 6, wherein the forward facing seat has an first open edge configured to permit a child sitting on the forward facing seat to position their legs over the first open edge and the rearward facing seat has a second open edge configured to permit a child sitting on the rearward facing seat to position their legs over the second open edge, the second open edge is positioned at a first height when the rearward facing seat is in the use position, and the second open edge is positioned at a second height when the rearward facing seat is in the storage position that is higher than the first height.

11. The stroller of claim 6, wherein the frame has a longitudinal axis, the rearward facing seat longitudinally overlaps the platform by a first amount when the rearward facing seat is in the use position, and the rearward facing seat longitudinally overlaps the platform by a second amount when the rearward facing seat is in the storage position that is less than the first amount.

12. The stroller of claim 11, wherein the second amount is zero.

13. The stroller of claim 11 wherein the first amount is greater than 25% of a longitudinal length of the platform.

14. The stroller of claim 6, wherein the frame has a longitudinal axis, the rearward facing seat longitudinally overlaps the platform when the rearward facing seat is in the use position, and the seat back longitudinally overlaps the rearward facing seat.

15. The stroller of claim 6, wherein the seat back includes a frame configured to be grasped by a child standing on the platform.

16. The stroller of claim 15, wherein the seat back includes fabric having a pair of pockets that expose portions of the seat back frame to be grasped by the child standing on the platform.

17. A stroller configured to support a child including
a frame,
a plurality of wheels supporting the frame,
a forward facing seat supported by the frame,
a rearward facing seat supported by the frame,
a seat back positioned to support a child reclining in the forward facing seat,
a platform positioned rearward of the forward facing seat to support a child standing on the platform, the platform having a forward edge and a rearward edge, and
a canopy pivotally coupled to the frame at a location rearward of the forward edge of the platform.

18. The stroller of claim 17, wherein the canopy pivots between a use position covering the platform and a storage position exposing the platform.

19. The stroller of claim 18, wherein the canopy has a forward edge, the forward edge of the canopy is positioned forward of seat back when in the use position, and the forward edge of the canopy is positioned rearward of the platform when in the storage position.

20. The stroller of claim 18, wherein canopy completely covers the rearward facing seat when in the use position.

21. The stroller of claim 20, wherein the canopy at least partially covers the forward facing seat when in the use position.

22. The stroller of claim 17, wherein the frame includes a handle member positioned for a user to push the stroller, the canopy is pivotally coupled to the frame rearward of the forward-most portion of the handle member.

23. The stroller of claim 22, wherein the canopy is pivotally coupled to the handle member.

* * * * *